Figure 4:
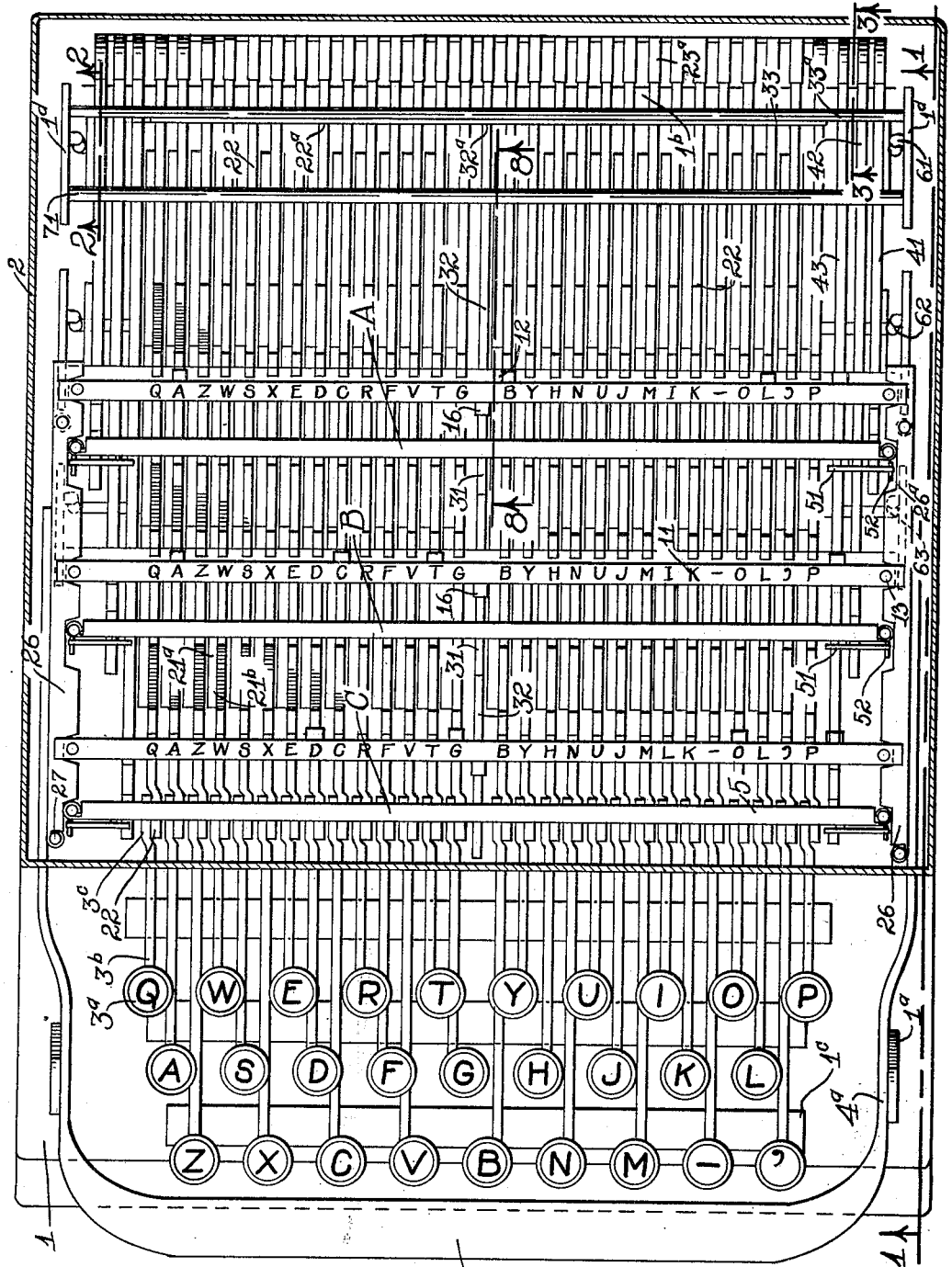

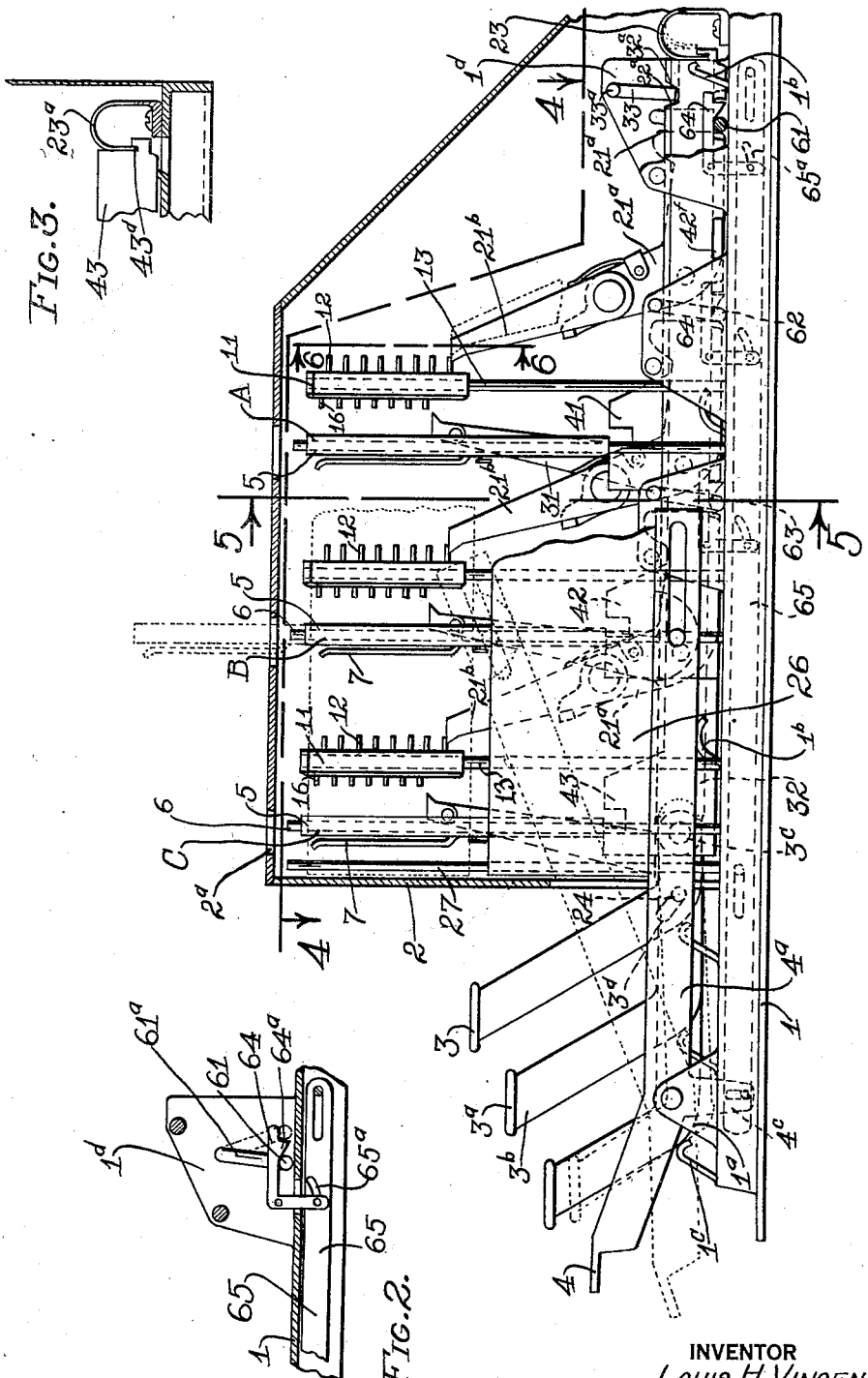

June 14, 1932.  L. H. VINCENT  1,862,872

EDUCATIONAL APPARATUS

Filed April 5, 1930  4 Sheets-Sheet 2

INVENTOR
*Louis H. Vincent*
BY *A. B. Bowman*
ATTORNEY

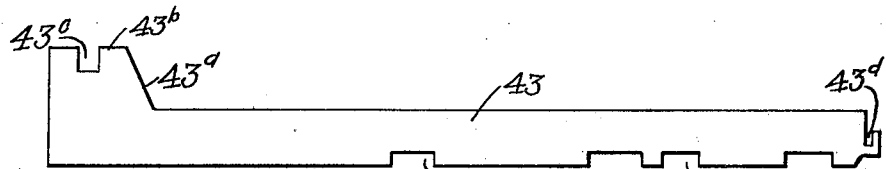
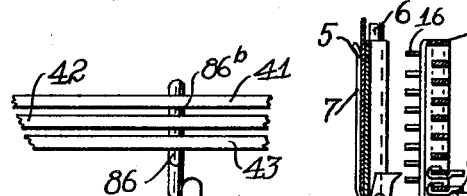
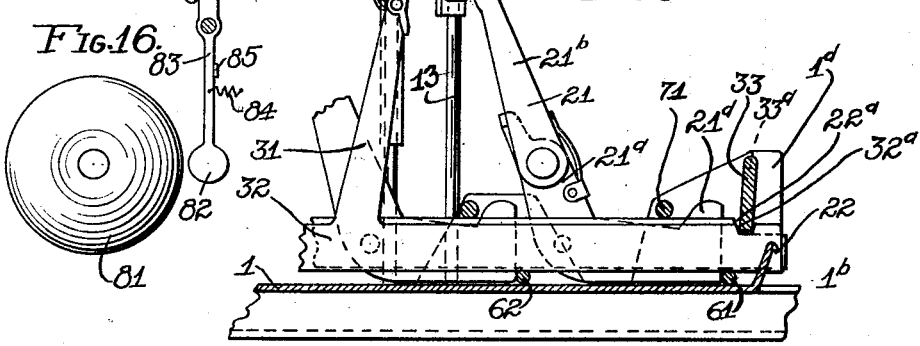
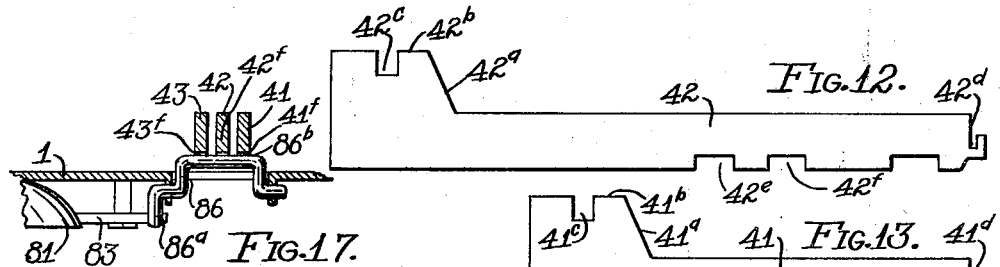
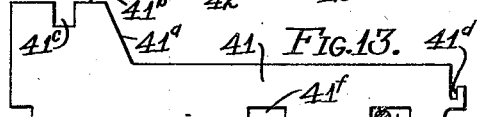
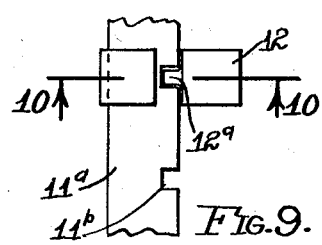
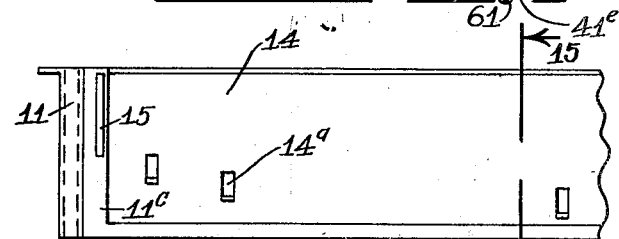
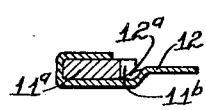
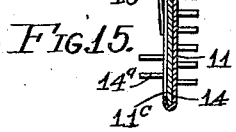

Patented June 14, 1932

1,862,872

UNITED STATES PATENT OFFICE

LOUIS H. VINCENT, OF SANTA PAULA, CALIFORNIA, ASSIGNOR OF ONE-HALF TO J. G. LEAVENS, OF SANTA PAULA, CALIFORNIA

EDUCATIONAL APPARATUS

Application filed April 5, 1930. Serial No. 441,809.

My invention relates to educational apparatus, and particularly to apparatus to aid in the instruction of the spelling of words.

The objects of this invention are: first, to provide an educational apparatus in the form of a typewriter which will stimulate the desire to spell words and to spell them correctly, and an apparatus of this class which may be operated in the form of a game in competitive manner; second, to provide an apparatus of this class whereby, when the desired word is spelled correctly, will give evidence of such correct spelling by an audible signal, or by presenting to the view of the operator the word or object of the word spelled, or by both the audible signal and such visible evidence; third, to provide an apparatus of this class having a multiplicity of cards or other means on which is shown the spelled word and the object of the word spelled, and an apparatus of this class in which only the card or other device showing the word spelled will be shifted into view and whereby the others will be locked in their concealed positions; fourth, to provide an apparatus of this class whereby the index means for setting the apparatus in condition for releasing the card or other device when the proper keys are actuated can be readily interchanged with others for setting the apparatus for spelling other words; fifth, to provide an index means for an apparatus of this class whereby the apparatus may be reset for spelling different words by mere shifting of certain lugs or other devices to predetermined positions; sixth, to provide novel means for placing the card, card holder, or other device in position to be raised or otherwise shifted into view when the proper keys are actuated; seventh, to provide novel and simple means for locking the other card holders, or all of the card holders, so that the same cannot be shifted into view when the wrong keys are depressed; eighth, to provide a novel tumbler means which is adapted to be actuated by the index means when the proper keys or letters are depressed for releasing the index means, said tumbler means placing the card holder in condition to be raised; ninth, to provide novel secondary fingers in cooperation with the index means and the primary fingers for limiting the movement of the index means to one half of its designated stroke or movement so that the index means will not be wholly released when the primary holding fingers for the index means are shifted out of the way when like letters follow each other in the word; tenth, to provide as a whole a novelly constructed apparatus of this class; and, eleventh, to provide an apparatus of this class which is relatively simple and economical of construction proportionate to its functions, durable, efficient, reliable, easy to operate and which will not readily deteriorate or get out of order.

Figure 5:
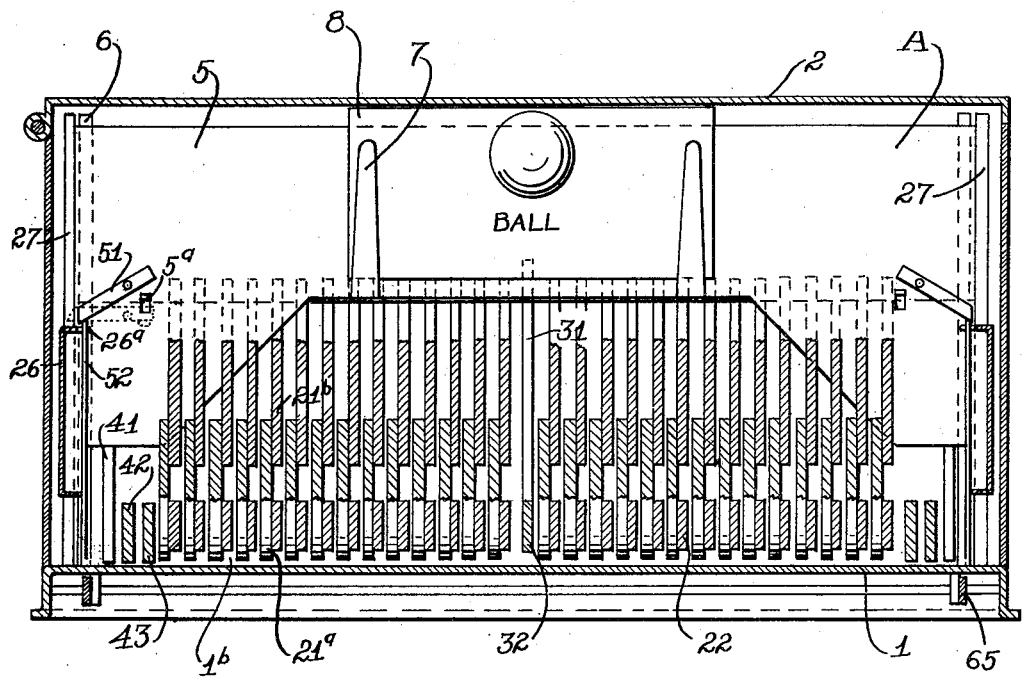
Figure 6:
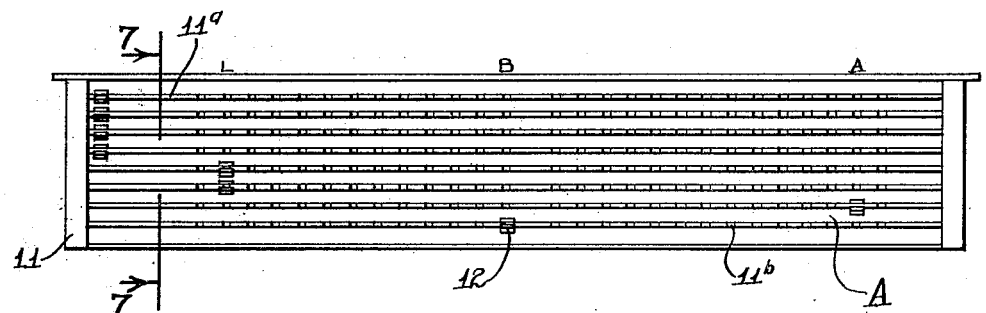
Figure 7:
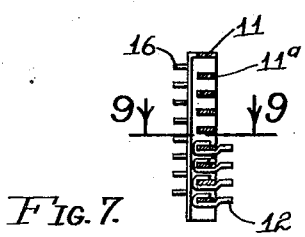

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a longitudinal sectional view of my educational apparatus in one form of construction, the section being taken at 1—1 of Fig. 4, certain parts and portions thereof being broken away and in section to facilitate the illustration and other parts being shown by dotted lines in their shifted positions; Fig. 2 is a fragmentary sectional elevational view thereof taken at 2—2 of Fig. 4, showing the locking means; Fig. 3 is a fragmentary sectional view thereof taken at 3—3 of Fig. 4; Fig. 4 is a partial sectional and partial plan view thereof taken at 4—4 of Fig. 1; Fig. 5 is a transverse sectional view thereof taken at 5—5 of Fig. 1; Fig. 6 is an elevational view of one of the index carriages taken from the rear side thereof; Fig. 7 is a transverse sectional view of the index carriage taken through 7—7 of Fig. 6; Fig. 8 is a fragmentary sectional elevational view thereof taken through 8—8 of Fig. 4; Fig. 9 is an enlarged fragmentary view through the index carriage taken at 9—9 of Fig. 7; Fig. 10 is an enlarged sectional view thereof taken through 10—10 of Fig. 9; Figs. 11, 12 and 13 are elevational views of the tumblers for locking, respectively, the front card holder, the intermediate card holder and the rear card holder; Fig. 14 is a fragmentary elevational view of a slightly modified form of construction of the index carriage; Fig. 15 is a sectional elevational view of said carriage taken through 15—15 of Fig. 14; Fig. 16 is a fragmentary plan view of the signalling means showing the base member removed, and Fig. 17 is a fragmentary sectional elevational view of the signalling means shown in Fig. 16.

Like characters of reference refer to similar parts and portions throughout the views of the drawings.

My educational apparatus is mounted on a base 1 and the greater portion of the mechanism thereof is enclosed in a casing 2 which is mounted on the base backwardly from its front end. On the base and in front of the casing are mounted a plurality of keys 3 which are arranged substantially as the keys of the letters of the alphabet on a typewriter. In front of the keys is a bar 4, corresponding to the spacer bar on a typewriter. This bar 4 connects the outer ends of two levers 4a which are pivotally mounted intermediate their ends on lugs or brackets 1a at the front end and opposite sides of the base 1. The opposite ends of these arms 4a extend into the casing 2 and are adapted, when the bar 4 is depressed, to raise one of a multiplicity of card holders A, B and C from and above the casing 2 through transverse openings 2a in the top wall thereof. These card holders are so arranged with the other portion of the apparatus that the same cannot be raised until the mechanism within the casing is set in a predetermined manner by the depressing of a predetermined group of keys in their predetermined sequence.

The card holders are arranged transversely within the casing and spaced one from the other. Each consists of a vertical carriage 5, which may be of sheet metal and reciprocably mounted in a vertical direction on guide rods 6 at its opposite ends, as shown best in Figs. 4 and 5. These carriages are provided intermediate their ends and at their forward sides with upwardly extending resilient fingers 7. Between these fingers and the carriage 5 itself is removably secured a card 8 on which may be written or printed the word to be spelled and also preferably an illustration of the object of the word. The card 8 on the carriage A, as shown in Fig. 5, shows the word "ball" and an illustration of a ball. When the proper set of keys 3 are depressed and the bar 4 is depressed, the carriage A with the card thereon its projected above the casing 2 so that the operator may see the picture and word on the card, and may be thus notified that the word was spelled correctly.

The setting or conditioning of the apparatus to permit the shifting of one of the cards into view depends upon the depressing of the proper keys 3 in predetermined sequence and upon the location of certain lugs on an index means. The index means or mechanism in this instance consists of an index carriage 11 on which are mounted a plurality of index lugs 12. In this instance there are three index carriages, one for each of the card holders. Each of the index carriages is arranged transversely of the casing adjacent the card holder it is adapted to release, and is reciprocably mounted on guide rods 13 extending upwardly from the base 1. Each of the index carriages is provided with a plurality of guides 11a extending from end to end of the carriage. On each of these guides is mounted a lug 12 which may be shifted thereon to a designated place shown by the letters at the upper edge of the carriage in Fig. 4, such location depending upon the location of the key 3. Each of the guides 11a is provided with a multiplicity of notches 11b, each notch corresponding to one of the letters of the alphabet or other characters, and is in vertical alignment with the designation of the letter or character at the upper edge of the carriage. The lugs 12 consists of resilient metal clips which partially encircle the guides and extend with one end backwardly from the guides, as shown on an enlarged scale in Figs. 9 and 10. Each of the lugs or clips 12 is provided inwardly from the extended ends thereof with an upwardly extending lug 12a which is adapted to enter a notch 11b for fixedly locating the lug or clip 12 thereon. The lug 12 may be shifted on the guide by depressing the backwardly extended end thereof until the lug 12a is withdrawn from the notch 11b and is then permitted freely to be shifted back and forth on the guide to the desired location thereon. The number of guides 11a on each index carriage depends upon the number of letters of the word desired to be spelled by or on the apparatus.

In the modified structure shown in Figs. 14 and 15 I have provided index plates 14 on which the index lugs 14a are permanently secured in fixed relation. With such a construction, a different index plate 14 is provided for each of the words desired to be spelled. This index plate 14 is removably mounted on the index carriage 11 by sliding the plate 14 into a vertical recess formed by flanges 11c at the opposite ends and the bottom of the index carriage. The index plate may be retained in position by a lug 15a carried at the end of a spring 15 secured to the index carriage. In order to remove the plate 14, the free end of the spring 15 is bent outwardly removing the lug 15a from a recess in the plate 14, permitting such plate to be removed and another substituted.

The index lugs 12 are located at one side of the index carriage, while at the other or forward side of the carriage are located other lugs, designated 16, which are similarly spaced apart vertically but are all positioned in superimposed and vertical alignment and are fixed relative to the carriage. The lugs 16, which I have referred to hereafter as secondary index lugs, cooperate with the lugs 12 for supporting the carriage in intermediate positions, as will be hereinafter described.

The index carriages are adapted to move in one direction for setting the apparatus so that the card holders may be shifted into view; in this instance, the index carriages are adapted to drop by the force of gravity so that the apparatus may be set for raising the card holders. The index carriages are prevented from dropping by a plurality of movable fingers 21, there being provided one set of fingers for each index carriage and card holder, and there being as many fingers in each set as there are keys on the keyboard. One of the fingers of each set is connected to its particular slide 22 which is reciprocably mounted in a longitudinal direction on the base, there being provided at the upper side of the base longitudinal ways cut into transverse ridges 1b struck up from the base. Thus, when one of the slides 22 is pushed backwardly, all of the fingers connected thereto are forced backwardly. To each of the slides is connected a key 3. Each key consists of a button 3a which is secured to the upper end of an L-shaped arm 3b, the forward end of the lower leg being pivotally connected to the slide, as indicated by 3c in Figs. 1 and 4. The other legs extend backwardly at an angle, as shown in Fig. 1, and rest normally at the lower ends of the outer edges on transverse ridges 1c struck upwardly from the base in front of the casing 2. As the keys 3 are depressed, the outer edges thereof slide with respect to the ridges 1c forcing the slides 22 to which they are connected backwardly. The slides 22 are held in engagement with the ridges 1c by a unitary spring 23 which is secured to the rear end of the base within the casing. The spring 23 is provided with a plurality of upwardly extending and forwardly and downwardly bowed independent spring portions 23a which engage with their ends the rear ends of the slides and normally force the same forwardly and the keys upwardly. The keys are prevented from being raised beyond their normal upper positions by a rod 24 which is secured to the front side of the casing 2 and which extends through inclined slots 3d in all of the keys and in the lower legs thereof, as shown best in Fig. 1.

Each of the fingers 21 is substantially L-shaped and is pivotally connected at the intersection of its legs to a slide 22 in such manner that the lower or horizontal leg overbalances the upwardly extending leg and tends to force the upper end of the upwardly extending leg 21a backwardly and away from the index carriage. The upper end of the leg 21a is preferably flexibly connected to the lower portion and is preferably in the form of a spring controlled and forwardly directed pawl 21b so that the index carriage may be raised easily from its lower position to its initial upper position without resistance from the finger 21, as will be hereinafter described more in detail.

The index carriages are raised to their uppermost positions, as shown by solid lines in Fig. 1, when the card holders 5 are projected from the casing, such upward shifting of the index carriages being effected by a pair of slides 26 at the opposite sides of and within the casing. These slides 26 are reciprocably mounted in vertical directions at their opposite ends on guide rods 27, as shown best in Figs. 1, 4 and 5. The slides 26 are raised and lowered by the operation of the bar 4 downwardly and upwardly, the backwardly extended ends of the arms 4a being pivotally connected to the lower portions of the slides 26, as shown best in Fig. 1.

When the index carriages are shifted to their upper positions, as stated, and if there are any lugs moved along the guides 11a opposite any of the notches thereon, or in alignment with the letters or other characters designated thereon, the index carriages, when released by the bar 4, will drop until the lowest lug 12 thereon engages and rests upon one of the fingers 21, it being noted that the fingers 21 are always shifted to their forward positions in the path of said lugs by the spring 23. The lugs 12 on the index carriage 11 in association with the card holder A are arranged for the spelling of the word "ball", one of the lugs being shifted on the lower guide 11a to the position B, designated by the letter at the upper edge of the index carriage, the lug on the next upper guide being shifted to the A position and the next two upper lugs being shifted on the corresponding guides to the L positions, as shown in Fig. 6. Thus, the index carriage will be supported by the lug 12 at the B position. When key "B" is depressed, the corresponding finger will be shifted backwardly free of such lug, permitting the index carriage to drop. But the index carriage will drop only one half the distance between the adjacent lugs or guides, the index carriage being supported at the half way position between consecutive lugs 12 by secondary fingers 31, one for each of the index carriages. These secondary fingers 31 are secured to and extend upwardly from a unitary slide 32 which is reciprocably mounted on the base 1 parallel to the slide 22. The slide 32 is shifted backwardly with the slides 22 and is shifted backwardly when any one of the slides 22 is shifted backwardly. Near the rear end of the upper edge of the slide 32 is provided a recess 32a into which extends the lower edge of a pivot member 33 which consists of a flat bar pivoted by trunnions 33a at its upper edge, as shown in Fig. 8. The trunnions of the pivot member 33 are supported on upwardly struck bracket portions 1d from the base. The lower edge of the pivot member 33 is adapted to be engaged by shoulders or abutments 22a near the rear ends and upper edges of the slides 22 when the keys 3 are depressed, for shifting the pivot member backwardly about its pivotal axis and for simultaneously forcing the secondary finger 31 backwardly.

When the finger 21, which supports the index carriage by the lug on the carriage, is shifted backwardly by the key 3 clear of the lug on the carriage, the secondary finger is simultaneously shifted backwardly between the secondary lugs 16 and support the index carriage at the half way position. When the key is released, the spring portions 23a force the slide to which the finger 21 is connected to its original position disengaging the secondary finger 31 from the secondary lugs in engagement therewith and permit the carriage to drop one half the distance between the lugs thereon until the second lug 12 rests upon the same or another finger 21. The index carriage is dropped one half at a time by the depressing of the successive keys for spelling the designated word. When the key of the last word is depressed, the index carriage drops free of the finger and drops on to the inclined edge of one of the tumblers 41, 42 or 43, the inclined edges of said tumblers being designated 41a, 42a and 43a. These tumblers are provided at their forward ends with raised portions 41b, 42b and 43b of which the inclined edges form respectively the rear edges. These raised portions 41b, 42b and 43b support at their upper edges the opposite ends of the card holders A, B and C, respectively, and are provided therein with notches 41c, 42c and 43c, respectively, for receiving the lower portions of the ends of the card holders when the tumblers are forced forwardly by the dropping of the index carriages on the inclined edges thereof.

It will be here noted that the rear ends of the tumblers are provided with notches 41d, 42d and 43d into which extend the ends of the loops of the spring portions 23a, as shown best in Fig. 3, for holding the tumblers in neutral positions for normally supporting the card holders on the upper edges of the raised portions 41b, 42b and 43b of the tumblers forwardly of the notches therein, as shown best in Fig. 1. When the inclined or cam edges 41a, 42a and 43a of the tumblers are engaged by the index carriages, the same are forced forwardly against the actions of the spring portions 23a.

When the tumblers are forced forwardly by the index carriages so that the card holders are permitted to drop into the notches 41c, 42c and 43c of the tumblers, certain pawls 51, which are pivotally mounted intermediate their ends on the side of and at the opposite ends of the card holders and which are normally held in inclined positions, as shown in Fig. 5, are shifted to horizontal positions, as shown by dotted lines in Fig. 5. When the card holders are supported on the upper edges of the raised portions of the tumblers, the pawls 51 are supported in their inclined positions, as shown by solid lines in Fig. 5, by supports 52 extending upwardly from the base, and when the card holders are permitted to drop into the notches of the tumblers, such supports tilt the pawls about their pivotal axes to the horizontal positions shown by dotted lines in Fig. 5. When the slides 26 are raised by depressing the bar 4, when the pawls 51 are in their inclined positions, the slides 26 pass the outer or lower ends of the pawls by reason of notches 26a at the upper edges of the slides, as shown in Figs. 4 and 5, but when the pawls 51 are shifted to their horizontal positions, the ends of the pawls are engaged by the upper edges of the slides and are raised, raising the card holders on their guides and projecting the card holders through the openings in the upper wall of the casing. It will be noted that when the pawls are shifted to their horizontal positions, the inner ends of the pawls engage lugs 5a on the card holders, which lugs 5a prevent the pawls from being tilted further about their pivotal axes than their horizontal positions, as shown in Fig. 5.

The mechanism is so arranged that only one card holder at a time may be projected into view, or, as in this instance, above the casing, and further that no card holder can be projected into view by depressing the bar 4 if the keys of the initial letters of a word (for which the apparatus is set) are not first depressed, or if the keys of the letters of one of the words are not depressed in sequence. Such control of the raising of the card holders is effected by a locking mechanism in connection with the keys, fingers and tumblers. The fingers 21 are pivotally connected to the slides 22 and when no weight of the index carriages is borne by the upper ends of the fingers, the same assume the solid line positions shown in Figs. 1 and 8, but when one of the lugs 12 rests upon the pawl at the upper end of the finger 21, the finger is shifted to the dotted line position, tilting the rear end of the finger 21 upwardly. At the rear end of the lower legs of the fingers 21 are provided transverse rods 61, 62 and 63, the same being arranged, respectively to cooperate with the card holders A, B and C. These rods are shiftable backwardly and are provided at the ends thereof with upwardly extending arms, as indicated by 61a in Fig. 2, which upwardly extended arms are pivoted on upwardly struck brackets 13 from the base, as shown in Fig. 2. Assuming that the lugs on the rearmost index carriage 11, that is the index carriage in cooperation with the card holder A, are arranged for the spelling of the word "ball" with the lug on the lower guide in alignment with the designation B at the upper edge of the index carriage, the lug on the second or next upper guide shifted to the position A, and the lugs on the next two upper guides shifted to the L position, and the lugs on the lower guides of the other index carriages shifted to positions other than the B position, the finger 21 engaged by the lug opposite the letter B on the index carriage in cooperation with the card holder A, will be tilted to the dotted line position, while the other fingers 21 connected to the same slide 22 will remain with their lower legs downwardly. When the key 3, designated with the letter B, is now depressed, the B slide will be shifted backwardly carrying the finger, mounted thereon, backwardly. Since the rearmost finger on such slide is tilted, the rear end thereof will be raised above the rod 61, while the other fingers will engage the rods 62 and 63 forcing the same backwardly. In connection with each of the rods 61, 62, and 63, I have provided pawls or catches 64 which are constructed in the form of bellcranks pivotally mounted at the intersecting portion of their legs with a pawl or catch portion 64a at the end of the horizontal leg, and with the other leg extending downwardly into the lower portion of the base 1. In the lower portion of the base are reciprocably mounted a pair of rods or bars 65 which are pivotally connected to the downwardly extending legs of the pawls 64. The forward ends of these bars 65 are pivotally connected to arms 4c extending downwardly from the pivotal portions of the arms 4a which support the bar 4. Thus, when the bar 4 is depressed, the arms 4c are tilted backwardly forcing the bars 65 backwardly, tilting the pawls 64 and disengaging the pawl or catch portions thereof from the rods 61, 62 and 63 and permitting the same to be shifted forwardly about their pivotal axes, the rods 61, 62 and 63 being preferably forced back to their forward positions by shoulders 41e, 42e and 43e at the rear ends of long notches at the lower edges of the tumblers, shown in Figs. 1, 11, 12 and 13, there being provided corresponding but longer notches in the other tumblers to provide clearance for the rods 61, 62 and 63. It will be noted that the reciprocating bars 65 are provided with arcuate slots 65a at their pivotal connections with the pawls 64 so that the pawls may be tilted about their pivotal axes without interference from the bars 65 when the rods 61, 62 and 63 are forced backwardly, in which event the pawls are tilted, the locked positions of the rods behind the pawl portion of the pawl being indicated by dotted lines in Fig. 2. Thus, it will be seen when the key B is depressed, the rod 61 will remain in its original position, while the rods 62 and 63 are shifted backwardly and are locked and retained in such positions by the pawls 64 is connection therewith.

It will be noted that when in their neutral positions, the rods 61, 62 and 63 are spaced a slight distance forwardly of the shoulders 41e, 42e and 43e of the tumblers. The initial backward movements of the rods 61, 62 and 63 are, therefore, independent of the tumblers but engage and move the respective tumblers 41, 42 and 43 backwardly during the end of the rearward movements of the rods. Thus, the tumblers are forced with their raised portions still farther under the card holders adapted to be locked, and away from the notches in said raised portions of the tumblers. Thus, the locked rods are engaged by the backwardly shifted tumblers and when the rods are released, the same are shifted to their original positions by the tumblers actuated by the spring portions 23a in engagement therewith.

It will be noted that when the index carriage rests upon a particular finger, such finger is tilted about its axis, but such tilting is limited by transverse rods 71 which are secured at their ends to suitable brackets carried by the base, as shown in Fig. 8. These rods 71 also retain the several slides in position in their guide portions on the base.

In order to increase the weight of the horizontal legs of the fingers 21 for normally tilting the same downwardly, such legs may be of considerable length, or the same may be provided with additional weight such as upwardly extended portions 21d at the rear end of the lower legs of the fingers, as shown in Figs. 1 and 8.

When the index carriage has been released by all of the fingers 21 and has dropped on to the inclined cam edge of its cooperating tumbler and has released the card holder in association therewith and set the pawls 51 so as to be raised by the slides 26, both the card holder and the cooperating index carriage are raised, the card holder above the casing and the index carriage so that a lug on the lower guide of the index carriage, when shifted in alignment with one of the letter or other character designations on the carriage, rests upon one of the fingers 21, for resetting the apparatus. Release of the bar 4 permits the card holder to be lowered upon the raised portion of its cooperating tumbler and the index carriage to be lowered upon the above mentioned finger 21.

When a certain word, for which the apparatus is set, is spelled correctly, and when no other keys have been depressed, a signal is given, the signal being given by a mechanism which may be actuated by the complete lowering of the index carriage, the forward movement of the associated tumbler, the dropping of the corresponding card holder, or by the raising device.

The signal mechanism, in this instance, is a bell 81 which may be mounted within the base. This bell is struck by a clapper 82 which is mounted at the one end of a lever 83 which is pivotally mounted intermediate its ends at the lower side of the base. The clapper may be held in disengaged relation with respect to the bell by a spring 84 holding the lever 83 against a stop 85. The lever 83 may be actuated by one arm 86a of a lever 86. The lever 86 may be in U-shaped form pivoted at the ends of its legs on the base 1 and with the connecting portion 86b of its legs extending through the base into notches 41f, 42f and 43f of the tumblers 41, 42 and 43. From one of the bearing portions may be extended the arm 86a for engaging the lever 83. But when any of the pawls are moved forwardly beyond their neutral positions when engaged by the dropping index carriage, the lever 86 is tilted, pivoting the lever 83 and moving the clapper against the bell.

The operation of my educational apparatus is briefly as follows:

Assuming that on the cards carried by the card holders A, B and C, the words or other symbols, or illustration, is printed, designating respectively the words "Ball", "Cat" and "Dog", and assuming that the lugs 12 on the index carriages are correspondingly shifted opposite the designated letters on said carriages for releasing the same when the proper keys are depressed, if then a different key is depressed from any of the letters with which each of the words "Ball", "Cat" and "Dog" begin, the fingers 21 in connection with such key is disengaged from any lug on the index carriages and tilted backwardly with their horizontal or lower legs inclined downwardly forcing all of the rods 61, 62 and 63 backwardly and locking the same in their rearward positions and preventing the card holders from dropping into the notches of the tumblers and the raising of the pawls 51, thus preventing the projection of any of the card holders from the casing until the bar 4 is first depressed which releases the pawls or catches holding the bars or rods 61, 62 and 63.

If, however, one of the letters or keys corresponding to such letters, with which one of the words begin, is depressed, the card holder having such words will not be locked while the others will be locked. When the first letter is depressed, the index carriage will drop one half notch. When the key of such letter is released, the next lug 12 will engage the same or another finger 21, that is, the finger corresponding to the second letter of the word. When the key of the second letter is depressed and released, the index carriage will drop another notch, and so on until the keys of all the letters are depressed. The index carriage will then drop on the inclined cam edge of the tumbler cooperating therewith and will be forced against the action of the spring portion 23a connected therewith forwardly, aligning the corresponding card holder in the notch in the tumbler and permitting the same to drop in said notch, raising the pawls 51 on said card holder and permitting said card holder to be raised when the bar 4 is depressed.

Such operation may be repeated as often as desired for any of the words for which the index carriages are set.

When it is desired to spell other words with the apparatus, the lugs 12 are shifted to the positions desired, or new plates 14 with the proper arrangement of lugs are substituted for the former, and correspondingly new cards 8 are fastened to the front sides of the card holders.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In an apparatus of the class described, a movable index carriage, a multiplicity of fingers in association with and positioned normally in the path of the carriage, each finger being normally positioned to check the movement of the carriage and keys, one operatively connected with each of the fingers for shifting the same free of the carriage, and allowing the movement of the carriage to be checked by another of said fingers said carriage being held against movement by one of the fingers at a time and adapted to be released when said finger is shifted by the key connected therewith.

2. In an apparatus of the class described, a movable index carriage having variously spaced index stops, a plurality of fingers positioned in alignment with the index stops and adapted successively to be engaged by said stops when said fingers are successively actuated for successively checking the movement of the carriage, and keys for each of the fingers for separately actuating the same.

3. In an apparatus of the class described, a movable index carriage, a multiplicity of fingers in association with the carriage, keys in connection with each of the fingers for shifting the same, said carriage being held against movement by one of the fingers at a time and adapted to be released when said finger is shifted by the key connected thereto, concealed card holding means, and means for retaining the latter means, the retaining means being engageable by the carriage; when the carriage is released by the fingers and moved to a predetermined point, said card holding means being released by the retaining means when the latter is engaged by the carriage, said card holding means when released being shiftable into view.

4. In an apparatus of the class described, a movable index carriage, a multiplicity of fingers in association with the carriage, keys in connection with each of the fingers for shifting the same, said carriage being held against movement by one of the fingers and adapted to be released when said finger is shifted by the key connected thereto, a card holder, a tumbler for supporting the card holder, said tumbler being engageable by the carriage when the same is released by the fingers, and means for shifting the card holder to a predetermined point when the same is released by the tumbler.

5. In an apparatus of the class described, a casing, a card holder positioned within the casing and adapted to be shifted into view, a carriage movably mounted in the casing, a multiplicity of keys in connection with the casing and adapted to be depressed by the fingers, a combination of said keys releasing said carriage, means operatively connecting said carriage with said card holder for releasing the latter whereby the same may be shifted into view.

6. In an apparatus of the class described, a card holder, means, normally disconnected from the card holder, for raising the card holder into view, means for operatively connecting the card holder with the last mentioned means, a tumbler for supporting the card holder, means for shifting the tumbler for releasing the card holder and actuating said connecting means.

7. In an apparatus of the class described, a card holder, means for raising the card holder, means for operatively connecting the card holder with the last mentioned means, a tumbler for supporting the card holder, an index carriage shiftably mounted adjacent the tumbler, a plurality of fingers adapted consecutively to support the carriage and to release the same for shifting the tumbler, and operating keys in connection with each of the fingers for shifting the same into disengaged relation relative to the carriage.

8. In an apparatus of the class described, an index means, a multiplicity of fingers in association therewith for controlling the movement thereof, keys in connection with each of the fingers for controlling the shifting of the fingers, a card holder in operative relation with said index means, said index means being adapted to release said card holder when said index means is released by said fingers, and means for shifting the card holder when released.

9. In an apparatus of the class described, an index carriage having lugs thereon designating letters, some of said lugs being arranged in superimposed relation to each other, a multiplicity of fingers positioned at one side of the carriage and adapted successively to support said carriage by said lugs and adapted to be shifted clear of said lugs for releasing the carriage, keys for shifting the fingers, said carriage having a plurality of other lugs all arranged in superimposed relation, and a secondary finger adapted to be engaged by the other lugs for supporting the carriage in half way positions when released by the first fingers.

10. In an apparatus of the class described, an index carriage having lugs thereon designating letters, some of said lugs being arranged in superimposed relation to each other, a multiplicity of fingers positioned at one side of the carriage and adapted successively to support said carriage by said lugs and adapted to be shifted clear of said lugs for releasing the carriage, keys for shifting the fingers, said carriage having a plurality of other lugs all arranged in superimposed relation, a secondary finger adapted to be engaged by the other lugs for supporting the carriage in half way positions when released by the first fingers, and means operatively connecting the second finger with the first fingers for shifting the second finger in the path of the other lugs when the carriage is released by the first fingers, said second finger being shifted to release said carriage when the first fingers are in position to support the carriage.

11. In an apparatus of the class described, an index carriage having lugs thereon corresponding to respective letters, some of said lugs being arranged in superimposed relation to each other, a multiplicity of fingers positioned at one side of the carriage and adapted successively to support said carriage by said lugs and adapted to be shifted clear of said lugs for releasing the carriage, keys for shifting the fingers, said carriage being provided at the opposite side with a row of superimposed secondary lugs, a secondary finger in association with the carriage for supporting the same by said secondary lugs at half way positions with the first fingers intermediate the positions of successive lugs of the first mentioned lugs, and means operatively connecting the first fingers to the second finger for shifting the secondary finger with the first fingers.

12. In an apparatus of the class described, a reciprocable carriage having guide means thereon and also letter designations at one side, a plurality of lugs mounted on said carriage one on each of the guide means and adapted to be shifted to various positions intermediate its ends opposite predetermined letter designations thereon, fingers in association with the carriage adapted successively to be engaged by said lugs for supporting the carriage successively in different positions, and means for controlling the fingers.

13. In an apparatus of the class described, a reciprocable carriage having guide means thereon and also letter designations at one side, a plurality of lugs mounted on said carriage one on each of the guide means and adapted to be shifted to various positions intermediate its ends opposite predetermined letter designations thereon, fingers in association with the carriage adapted successively to be engaged by said lugs for supporting said carriage successively in different positions, means for controlling the fingers, card holding means in association with the carriage, means for shifting the carriage and card holding means, and means operatively connecting said card holding means with the last mentioned means when said carriage is released by all of said fingers.

14. In an apparatus of the class described, a casing, a card holder mounted in the casing and adapted to be raised above the same, an index means shiftably mounted within the casing, keys and finger means cooperating with said index means for controlling the movement of the index means, means operatively connecting the index means with the card holder for controlling the movements of the latter, manual means, and means operatively connecting the card holder with the manual means whereby the card holder may be raised above the casing by the manual means.

15. In an apparatus of the class described, a casing, a card holder mounted in the casing and adapted to be raised, above the same, an index means shiftably mounted within the casing, keys and finger means cooperating with said index means for controlling the movement of the index means, means operatively connecting the index means with the card holder for controlling the movements of the latter, manual means, means operatively connecting the card holder with the manual means whereby the card holder may be raised above the casing by the manual means, and signal means for signaling when said card holder is operatively connected to said raising means and when said card holder is adapted to be raised.

16. In an apparatus of the class described, a plurality of card holders, a manual member for raising one of the card holders at a time during one cycle of operation of the apparatus, means for separately connecting said card holders to said manual card raising member, an index mechanism for each of the card holders, each of the index mechanisms being shiftably mounted and each having different control indicia, and finger and key means in connection with all of said index mechanisms for separately controlling the movement of each, each of the index mechanisms controlling the connection between the card raising member and one of the card holders.

17. In an apparatus of the class described, a plurality of card holders, a manual member for raising one of the card holders at a time during one cycle of operation of the apparatus, means for separately connecting said card holders to said manual card raising member, an index mechanism for each of the card holders, each of the index mechanisms being shiftably mounted and each having different control indicia, finger and key means in connection with all of said index mechanisms for separately controlling the movement of each, each of the index mechanisms controlling the connection between the card raising member and one of the card holders, and means for locking all or all but one of said card holders when the wrong keys are actuated.

18. In an apparatus of the class described, a movable index carriage, a multiplicity of fingers in association with the carriage, keys in connection with each of the fingers for shifting the same, said carriage being held against movement by one of the fingers and adapted to be released when said finger is shifted by the key connected thereto, a card holder, means for shifting the card holder to a predetermined point, and means shiftable by the carriage, when the same is released by the fingers, for releasing the card holder so that it may be shifted by the shifting means.

19. In an apparatus of the class described, a movable index carriage, a multiplicity of fingers in association with the carriage, keys in connection with each of the fingers for shifting the same, said carriage being held against movement by one of the fingers and adapted to be released when said finger is shifted by the key connected thereto, a card holder, and means operatively connecting the card holder and carriage, when the latter is released by the fingers, for shifting the card holder and carriage to a predetermined point.

20. In an apparatus of the class described, a movable index carriage, a multiplicity of fingers in association with the carriage, keys in connection with each of the fingers for shifting the same, said carriage being held against movement by one of the fingers and adapted to be released when said finger is shifted by the key connected thereto, a card holder, means for shifting the index carriage to its original position, and a tumbler engageable by the carriage when the latter is released by the fingers, for shifting the tumbler and operatively connecting the card holder to the latter means, said card holder being also shiftable into view by said means when the index carriage is shifted to its original position.

21. In an apparatus of the class described, a movable index carriage, a multiplicity of fingers in association with and positioned normally in the path of the carriage, keys in connection with each of the fingers for shifting the same free of the carriage, other fingers in association with but normally clear of the path of the carriage, other keys in connection with the latter fingers for shifting the same, and a shiftably mounted tumbler, said tumbler being shiftable by any of the other fingers when the keys in connection therewith are shifted, for preventing the maximum movement of the index carriage when the same is released by the fingers normally in the path thereof.

22. In an apparatus of the class described, a movable index carriage, a multiplicity of fingers in association with and positioned normally in the path of the carriage, keys in connection with each of the fingers for shifting the same free of the carriage, other fingers in association with but normally clear of the path of the carriage, other keys in connection with the latter fingers for shifting the same, a shiftably mounted tumbler, said tumbler being shiftable by any of the other fingers when the keys in connection therewith are shifted, for preventing the maximum movement of the index carriage when the same is released by the fingers normally in the path thereof, a card holder, a pawl in association with the card holder, and means for shifting the carriage to its original position, said pawl being shiftable only when the carriage is shifted its maximum distance when released by the fingers, said pawl, when so shifted, operatively connecting the card holder to the shifting means for shifting the card holder to a predetermined point.

23. In an apparatus of the class described, a movable index carriage, a multiplicity of fingers in association with and positioned normally in the path of the carirage, keys in connection with each of the fingers for shifting the same free of the carriage, other fingers in association with but normally clear of the path of the carriage, other keys in connection with the latter fingers for shifting the same, a shiftably mounted tumbler, said tumbler being shiftable by any of the other fingers when the keys in connection therewith are shifted, for preventing the maximum movement of the index carriage when the same is released by the fingers normally in the path thereof, a card holder, a pawl in association with the card holder, means for shifting the carriage to its original position, said pawl being shiftable only when the carriage is shifted its maximum distance when released by the fingers, said pawl, when so shifted, operatively connecting the card holder to the shifting means for shifting the card holder to a predetermined point, and means for locking the tumbler when the same is shifted by any of the other fingers, said shifting means being operatively connected to said locking means for releasing the latter when the shifting means is shifted for shifting the carriage.

24. In an apparatus of the class described, a movable index carriage, a multiplicity of fingers in association with and positioned normally in the path of the carriage, keys in connection with each of the fingers for shifting the same free of the carriage, other fingers in association with but normally clear of the path of the carriage, other keys in connection with the latter fingers for shifting the same, a shiftably mounted tumbler, said tumbler being shiftable by any of the other fingers when the keys in connection therewith are shifted, for preventing the maximum movement of the index carriage when the same is released by the fingers normally in the path thereof, means for locking the tumbler in its shifted position when shifted by said other fingers, and means for releasing the tumbler from the locking means and for shifting the index carriage to its original position.

25. In an apparatus of the class described, a shiftable carriage having separate guide means mounted on said carriage, said guide means being positioned adjacent each other, a plurality of lugs mounted on each of the guide means and adapted to be shifted to various predetermined positions intermediate the ends thereof, fingers in association with the carriage adapted successively to be engaged by said lugs, said fingers forming stops therefor, and means for controlling the movement of the fingers.

In testimony whereof, I have hereunto set my hand at Santa Paula, California, this 8th day of March, 1930.

LOUIS H. VINCENT.